United States Patent
Middendorf et al.

(10) Patent No.: US 11,455,462 B2
(45) Date of Patent: *Sep. 27, 2022

(54) TABLE ITEM INFORMATION EXTRACTION WITH CONTINUOUS MACHINE LEARNING THROUGH LOCAL AND GLOBAL MODELS

(71) Applicant: Open Text SA ULC, Halifax (CA)

(72) Inventors: Matthias Theodor Middendorf, Constance (DE); Gisela Barbara Cäcilie Hammann, Grasbrunn/München (DE); Carsten Peust, Constance (DE)

(73) Assignee: Open Text Software SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/134,964

(22) Filed: Dec. 28, 2020

(65) Prior Publication Data

US 2021/0150133 A1 May 20, 2021

Related U.S. Application Data

(63) Continuation of application No. 16/272,692, filed on Feb. 11, 2019, now Pat. No. 10,909,311, which is a (Continued)

(51) Int. Cl.
*G06F 17/00* (2019.01)
*G06F 40/174* (2020.01)
(Continued)

(52) U.S. Cl.
CPC ........ *G06F 40/174* (2020.01); *G06F 16/2282* (2019.01); *G06F 16/258* (2019.01);
(Continued)

(58) Field of Classification Search
CPC .... G06F 40/174; G06F 40/177; G06F 40/186; G06F 40/216; G06F 40/274;
(Continued)

(56) References Cited

U.S. PATENT DOCUMENTS

2006/0288015 A1* 12/2006 Schirripa .............. G06F 16/951
2009/0044095 A1* 2/2009 Berger .................. G06F 16/258
715/226

(Continued)

OTHER PUBLICATIONS

Shigarov, Alexey, Andrey Mikhailov, and Andrey Altaev. "Configurable table structure recognition in untagged PDF documents." Proceedings of the 2016 ACM symposium on document engineering. 2016 (Year: 2016).*

(Continued)

*Primary Examiner* — Andrew T Mcintosh
(74) *Attorney, Agent, or Firm* — Sprinkle IP Law Group

(57) ABSTRACT

A bipartite application implements a table auto-completion (TAC) algorithm on the client side and the server side. A client module runs a local model of the TAC algorithm on a user device and a server module runs a global model of the TAC algorithm on a server machine. The local model is continuously adapted through on-the-fly training, with as few as a negative example, to perform TAC on the client side, one document at a time. Knowledge thus learned by the local model is used to improve the global model on the server side. The global model can be utilized to automatically and intelligently extract table information from a large number of documents with significantly improved accuracy, requiring minimal human intervention even on complex tables.

20 Claims, 14 Drawing Sheets

Related U.S. Application Data continuation of application No. 15/964,654, filed on Apr. 27, 2018, now Pat. No. 10,241,992.

(51) Int. Cl.

| | |
|---|---|
| *G06N 20/00* | (2019.01) |
| *G06F 16/93* | (2019.01) |
| *G06F 16/22* | (2019.01) |
| *G06F 16/25* | (2019.01) |
| *G06K 9/62* | (2022.01) |
| *G06F 40/177* | (2020.01) |
| *G06F 40/186* | (2020.01) |
| *G06F 40/216* | (2020.01) |
| *G06F 40/274* | (2020.01) |
| *G06V 30/412* | (2022.01) |
| *G06V 30/414* | (2022.01) |
| *G06V 30/416* | (2022.01) |

(52) U.S. Cl.
CPC ............ *G06F 16/93* (2019.01); *G06F 40/177* (2020.01); *G06F 40/186* (2020.01); *G06F 40/216* (2020.01); *G06F 40/274* (2020.01); *G06K 9/6262* (2013.01); *G06N 20/00* (2019.01); *G06V 30/412* (2022.01); *G06V 30/414* (2022.01); *G06V 30/416* (2022.01)

(58) Field of Classification Search
CPC .... G06F 16/258; G06F 16/93; G06F 16/2282; G06K 9/00463; G06K 9/6262; G06K 9/00469; G06K 9/00449; G06N 20/00
See application file for complete search history.

(56) References Cited

U.S. PATENT DOCUMENTS

| | | | |
|---|---|---|---|
| 2012/0192051 A1* | 7/2012 | Rothschiller | G06F 16/26 715/217 |
| 2014/0337257 A1* | 11/2014 | Chatterjee | G06N 20/00 706/12 |
| 2017/0139887 A1* | 5/2017 | Miller | G06F 40/166 |

OTHER PUBLICATIONS

Shahab, Asif, et al. "An open approach towards the benchmarking of table structure recognition systems." Proceedings of the 9th IAPR International Workshop on Document Analysis Systems. 2010 (Year: 2010).*

* cited by examiner

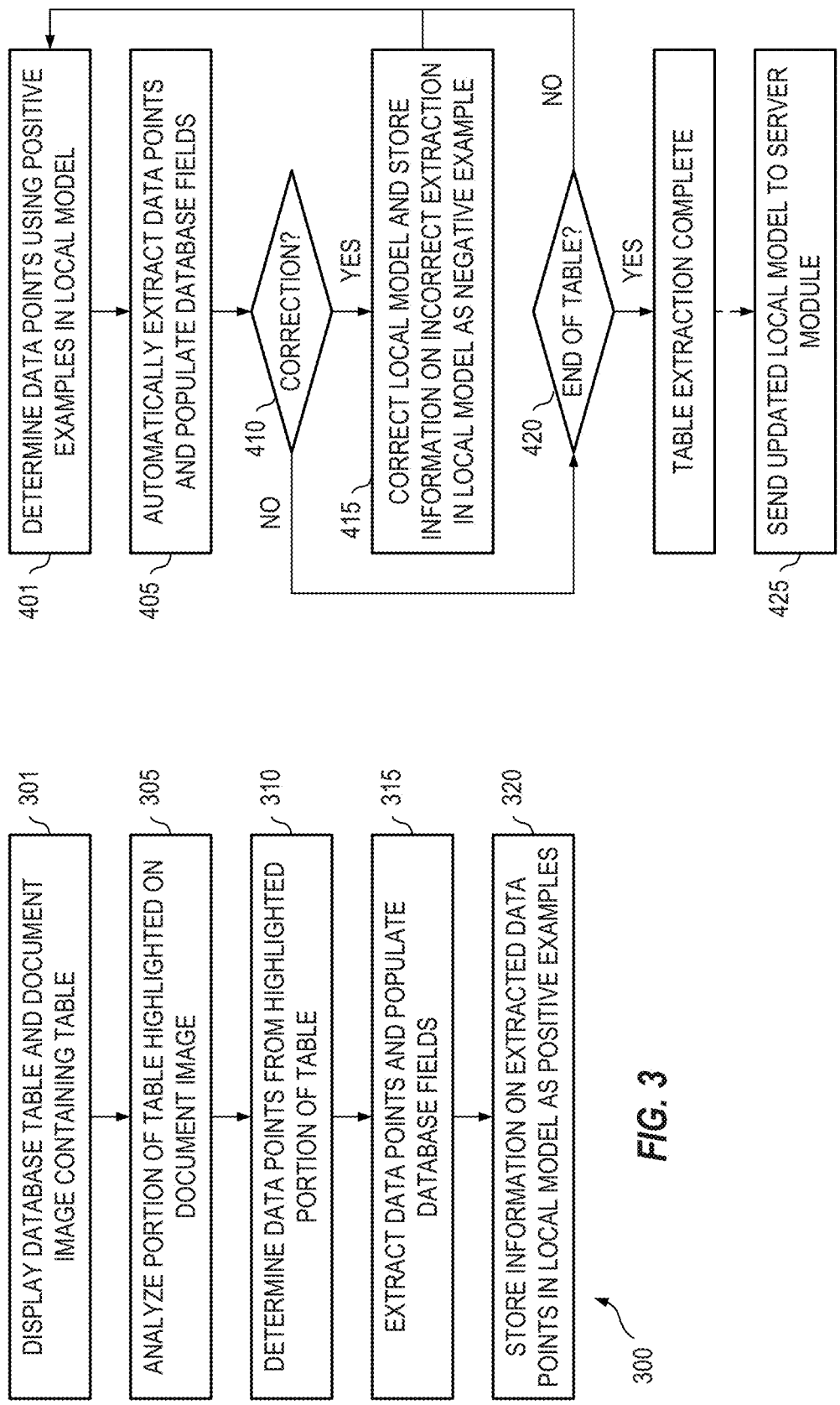

FIG. 5F

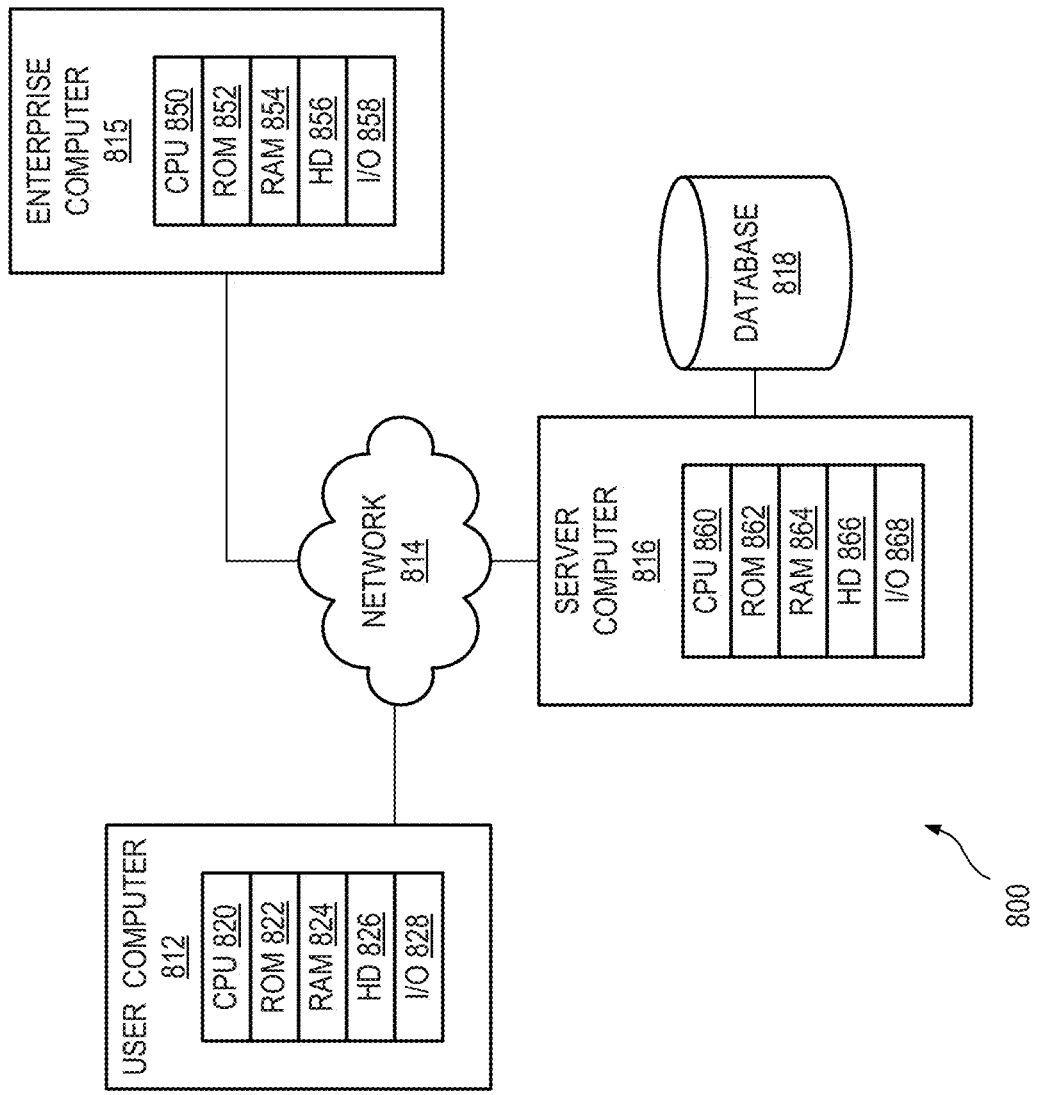

TABLE ITEM INFORMATION EXTRACTION WITH CONTINUOUS MACHINE LEARNING THROUGH LOCAL AND GLOBAL MODELS

CROSS-REFERENCE TO RELATED APPLICATIONS

This is a continuation of, and claims a benefit of priority under 35 U.S.C. § 120 from, U.S. patent application Ser. No. 16/272,692, filed Feb. 11, 2019, issued as U.S. Pat. No. 10,909,311, entitled "TABLE ITEM INFORMATION EXTRACTION WITH CONTINUOUS MACHINE LEARNING THROUGH LOCAL AND GLOBAL MODELS," which is a continuation of, and claims a benefit of priority under 35 U.S.C. § 120 from, U.S. patent application Ser. No. 15/964,654, filed Apr. 27, 2018, issued as U.S. Pat. No. 10,241,992, entitled "TABLE ITEM INFORMATION EXTRACTION WITH CONTINUOUS MACHINE LEARNING THROUGH LOCAL AND GLOBAL MODELS," all of which are fully incorporated by reference herein for all purposes.

TECHNICAL FIELD

This disclosure relates generally to image analysis and feature extraction. More particularly, this disclosure relates to table item information extraction systems and methods with continuous machine learning through local and global models, useful for automatically, efficiently, and accurately acquiring table data from massive amounts of documents in an enterprise computing environment with minimal human intervention.

BACKGROUND OF THE RELATED ART

Image analysis and feature extraction technologies have come a long way. U.S. Pat. No. 8,270,721 describes a variety of methods and systems for acquiring data from machine-readable documents and provides a new solution for acquiring table data from machine-readable documents. In U.S. Pat. No. 8,270,721, individual data are extracted from a document, as automatically as possible, and are entered into corresponding database fields. When data cannot be extracted from the document with a desired degree of reliability for particular database fields, the document is displayed with the database fields for which the data cannot be extracted. A proposal routine is executed so that string sections, in a vicinity of a pointer movable by a user on the display screen, are selected, marked, and proposed for extraction. In this way, the user is informed of the database field for which the data must still be extracted from the document shown on the display screen and can then transfer or incorporate the proposed string section into the database field merely by actuating a particular key. Through the automatic selecting and marking of the string section, the process of incorporating the still-missing data is significantly simplified and accelerated.

SUMMARY OF THE DISCLOSURE

An object of the invention is to provide innovations and improvements to image analysis and feature extraction technologies in enterprise computing environments. Another object of the invention is to learn, on-the-fly, from initial minimal user feedback (e.g., a line or two extracted from a table and corrected by a user) and be able to leverage the learned knowledge to automatically complete the rest of the table extraction, while continuously self-adapting to improve performance. Yet another object of the invention is to combine local learning (on the user side) and global learning (on the server side) and be able to leverage the combined knowledge to automatically, or substantially automatically, extract table item information from massive amounts of documents.

To realize these and other objects, the invention provides table item information extraction systems and methods with continuous machine learning through local and global models. In some embodiments, a method of the invention can include displaying a database table and an image on a user device through a user interface of a bipartite application. The database table can have a plurality of columns. The number of columns can be customized using the user interface. The image can be a scanned image of a document containing a table. The table can contain coded text generated by an optical character recognition (OCR) function in a manner known to those skilled in the art.

The bipartite application has two parts—a client module implemented on the user device and a server module implemented on a server machine operating in a backend of an enterprise computing environment. The client module includes a local model of a table auto-completion algorithm and the server module includes a global model of the table auto-completion algorithm. The user interface includes a user interface element associated with the table auto-completion algorithm.

Responsive to a user selecting the user interface element displayed on the user device, the client module running the local model of the table auto-completion algorithm is operable to analyze a portion of the table highlighted by the user on the user interface, the portion of the table highlighted by the user on the user interface defining initial coordinates on the user interface; determine a data point for each column of the database table using the initial coordinates; automatically extract data points thus determined from the table; enter the data points automatically extracted from the table into the plurality of columns of the database table; and store information about the data points in the local model as positive examples.

The method may further include determining, by the client module running the local model of the table auto-completion algorithm utilizing the positive examples in the local model, a plurality of additional data points in the table; automatically extracting the plurality of additional data points from the table; and entering the plurality of additional data points extracted from the table into the plurality of columns of the database table. In some embodiments, the local model includes a plurality of models, including a cell model defining properties of cells of a given column, a line model defining a number of cells per line and transition there-between, and a document model defining line distances and a number of lines per document. In some embodiments, the global model of the table auto-completion algorithm is similarly defined. In some embodiments, the plurality of additional data points is automatically extracted from the table utilizing the cell model, the line model, and the document model. In some embodiments, these models encompass elements that describe a layout of a document of a certain document type, including an orientation of the document.

Once entered, the user can view the plurality of additional data points automatically extracted from the table through the plurality of columns of the database table displayed on the user interface on the user device. The plurality of columns of the database table displayed on the user interface on the user device is manually editable. Thus, if an automatically extracted and entered data point in the plurality of columns of the database table displayed on the user interface on the user device is incorrect, the user can provide a correction through the user interface.

Accordingly, the method may further include receiving a correction to a data point of the plurality of additional data points automatically extracted from the table; and correcting the local model to learn from the correction to the data point and include the data point in the local model as a negative example. For instance, perhaps the number of cells per line and/or transition there-between was incorrect, or perhaps a line distance was incorrect. The correction from the user is used by the client module to fine-tune the local model where applicable and the incorrect information is kept by the local model as a negative example.

At this time, the local model has some positive examples from the initial user input (e.g., the initial coordinates determined from a portion of the table highlighted by the user on the user interface) and one negative example (e.g., the number of cells per line is not 4). For some tables, this kind of on-the-fly training with a few positive and negative examples is all the local model needs to complete the rest of the table extraction automatically (referred to as table auto-completion or TAC). The amount of on-the-fly training of the local model (by positive and negative examples) can vary depending upon the complexity of a table. As an example, a complex table can have a plurality of items, each item containing multiple lines or rows. Due to the semi-structured nature of such a table, the number of lines may vary throughout the table, making it extremely difficult for a machine to read out table data correctly. Further complicating the matter is that sometimes only one or two pieces of information (features) from each item would be needed for extraction. Accordingly, the more complex a table, the more training of the local model may be needed in order for the local model to perform TAC accurately.

Because the local model can learn from each mistake (as a negative example), the performance of the local model (e.g., TAC accuracy) can be improved with each correction. That is, the client module can continuously adapt the local model to learn, on-the-fly, by positive and negative examples and automatically continuously extract table information from the table utilizing the positive and negative examples until extraction of the table information from the table is automatically completed. The learned knowledge gained by the local model from the on-the-fly training with respect to a certain document type (which has a particular layout associated therewith) can be leveraged to improve the overall performance of the table auto-completion algorithm.

For example, in some embodiments, the local model thus trained can be communicated to the backend and used by the server module to update the global model of the table auto-completion algorithm. Generally, the global model is trained on previously processed documents. The learned knowledge gained by the local model from the on-the-fly training with respect to a certain document type (which has a particular layout associated therewith) can further improve the global model and increase the performance of the global model in TAC accuracy (without needing a human to train the global model by positive and negative examples.

In this way, the server module executing on the server machine can leverage the learned knowledge from the local model in performing table extraction with respect to a particular document type to improve the global model accordingly and utilize the improved global model to perform automatic extraction of table information from a mass amount (e.g., hundreds, thousands, and tens of thousands, etc.) of documents of the same document type and automatically enter the table information thus extracted from the documents into database fields.

One embodiment comprises a system comprising at least one processor and at least one non-transitory computer-readable storage medium that stores computer instructions translatable by the processor to perform a method substantially as described herein. Another embodiment comprises a computer program product having at least one non-transitory computer-readable storage medium that stores computer instructions translatable by at least one processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. The features illustrated in the drawings are not necessarily drawn to scale.

FIG. 3 is a flow chart illustrating an example of a method for training a local model with positive examples according to some embodiments.

FIG. 4 is a flow chart illustrating an example of a method for training a local model with a negative example according to some embodiments.

FIGS. 5A-5F depict diagrammatic representations of a user interface of a bipartite application implementing a table auto-completion algorithm, illustrating an example of on-the-fly training of a local model of the table auto-completion algorithm according to some embodiments.

FIG. 8 depicts a diagrammatic representation of an example of an enterprise computing environment where embodiments disclosed can be implemented.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
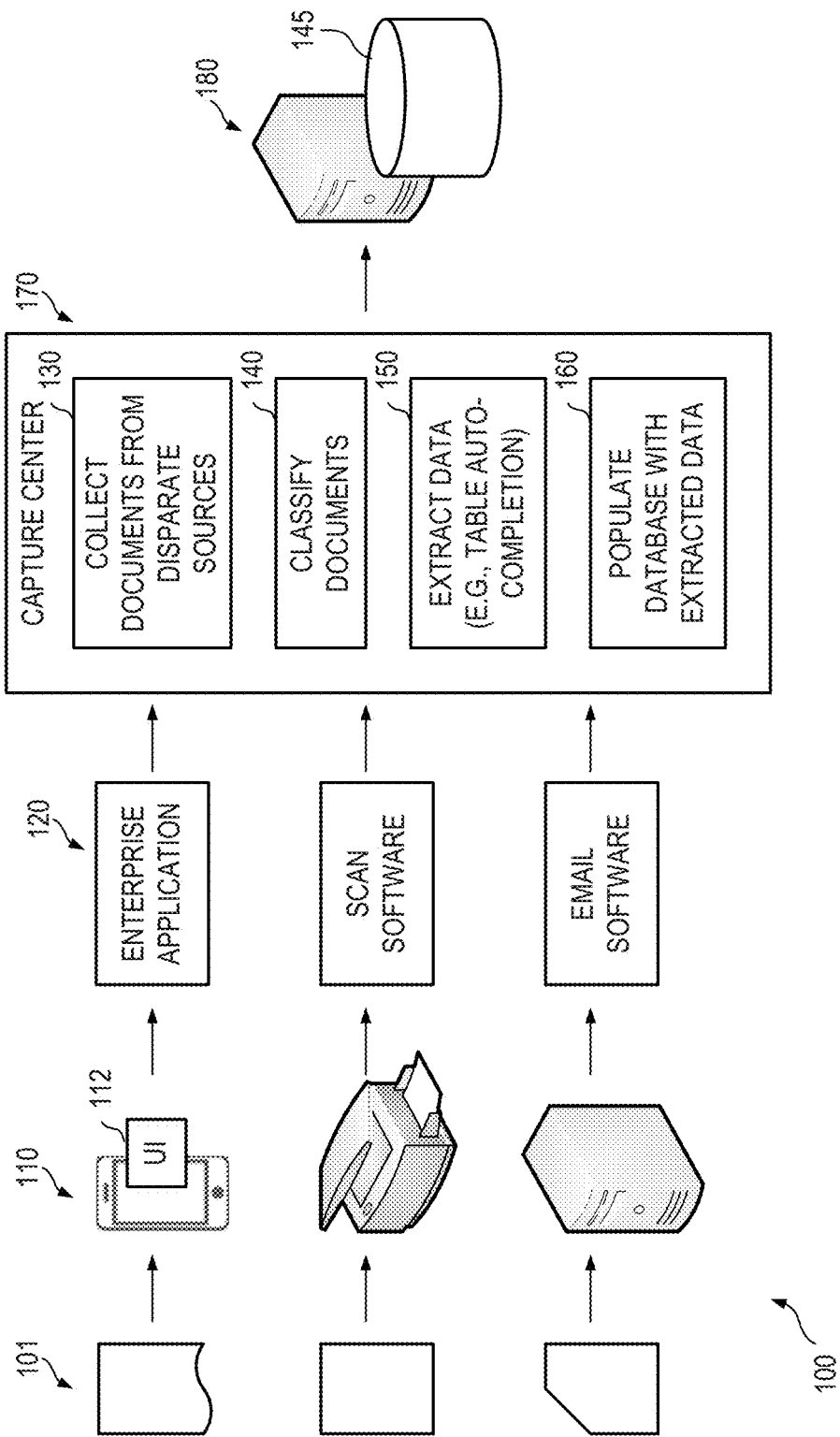
FIG. 1 depicts a diagrammatic representation of a network computing environment where embodiments disclosed herein can be implemented.

As described above, image analysis and feature extraction technologies have come a long way. However, as noted in U.S. Pat. No. 8,270,721, with prior methods and systems, it is not always possible automatically fill all database fields of a database reliably with data extracted from documents. There could be many causes for the difficulty in implementing automated data extraction with high accuracy and completeness. For example, as illustrated in FIG. 1, documents 101 may be received from disparate sources 110. Documents 101 themselves may be of a heterogeneous nature, with different formats, layouts, types, and/or contents. Further, a variety of applications 120 running on disparate sources 110 may handle documents 101 differently and have different requirements on what kind of documents and/or network communications protocols they support (e.g., via emails, web applications, application programming interface calls, etc.). Sometimes documents 101 can be so different and unlike one another that they cannot be compared by data extraction machines automatically.

Embodiments disclosed herein can improve image analysis and feature extraction so that automated data extraction can be performed on massive amounts of documents in enterprise computing environments with high accuracy and completeness. FIG. 1 depicts a diagrammatic representation of a network computing environment 100 where embodiments disclosed herein can be implemented.

As illustrated in FIG. 1, heterogeneous documents 101 may be received, through applications 120 running on disparate sources 110, by a document recognition and data processing platform referred to as capture center 170. OpenText™ Capture Center, available from Open Text, headquartered in Canada, is an example of a computing platform that can implement capture center 170.

Capture center 170 may include a plurality of subsystems (e.g., subsystems 130, 140, 150, 160) configured for providing advanced document and character recognition capabilities for processing documents 101 into machine-readable information that can be stored in a data store 145 and used by any subsequent computing facility, represented by an enterprise server 180 in FIG. 1. Non-limiting examples of subsequent computing facilities can include, but are not limited to, content servers, archive servers, case management systems, customer relation management systems, record management systems, invoice management systems, etc.

Generally, subsystem 130 is configured for collecting or receiving documents 101 from disparate sources 110 (e.g., through software applications 120). Documents 101 can include invoices, purchase orders, debit notes, credit notes, delivery notes, and so on. Where applicable (e.g., when documents received are actually scanned images), subsystem 130 can separate or split a batch of images into individual (e.g., multi-page) documents. When documents 101 do not already contain coded text, subsystem 130 can run an OCR function to transform pixels into characters (coded text).

Subsystem 140 is configured for classifying these documents. The classification may entail examining a document and determining a document type (e.g., .invoice, .delivery note, .order, .other, etc.) for the document. Each document type may be characterized by a set of features (e.g., a number of lines per document, line distances, a number of cells per line, transition between cells on the same line, properties (e.g., size, content, alignment, etc., each with typical average and variance) of cells in a column, and so on.

Subsystem 150 is configured for extracting data from the documents thus classified. The data exaction, which may be performed depending upon the document type, may entail searching for certain features in a document that correspond to the document type. For example, if a document is classified as an invoice type and the invoice type is associated with a set of features such as date, amount, order number, and supplier, subsystem 150 may operate to search the document for date, amount, order number, and supplier and extract these features from the document.

Subsystem 160 is configured to interpret the extracted features and store the results (e.g., extracted data with enhanced contextual information) in data store 145 which, in some embodiments, can contain a database accessible by enterprise server 180. The interpretation by subsystem 160 can include data manipulation and transformation. As a non-limiting example, suppose the date feature extracted from the document is textual information in the form of "Month Day, Year" (e.g., "Apr. 20, 2018"). Subsystem 160 can transform this textual information into a numerical form (e.g., "04202018"). As another example, suppose the supplier feature extracted from the document is textual information bearing the actual name of a supplier. Subsystem 160 can search a supplier database, find a supplier identifier associated with that name, and store the supplier identifier in data store 145 as part of the extracted data.

In some embodiments, subsystem 150 includes a new table auto-completion capability. In some embodiments, the new table auto-completion capability can be implemented as a function accessible by a user through a user interface 112 of an enterprise application 120 that functions as client software of capture center 170. As discussed below, the new table auto-completion capability implements adaptive (learning) technology so that subsystem 150 can continuously self-adapt to improve performance (e.g., data extraction accuracy, completeness, speed, etc.).

Figure 2:
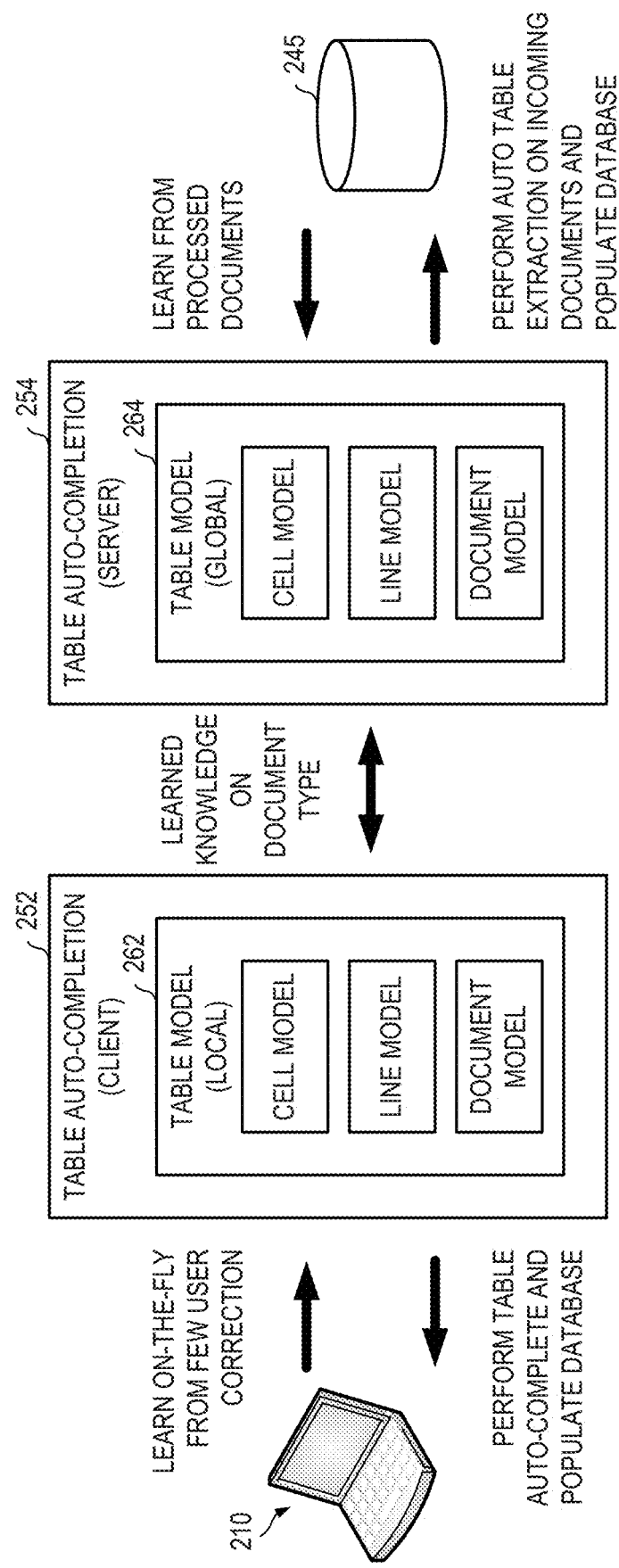
FIG. 2 depicts a diagrammatic representation of a bipartite application implementing a table auto-completion algorithm on the client side and the server side according to some embodiments.

In some embodiments, the new table auto-completion capability is realized in a table auto-completion algorithm implemented in a bipartite application that has two parts, one on the client side and one on the server side. As illustrated in FIG. 2, bipartite application 200 may include a client module 252 on the client side and a server module 254 on the server side. Through bipartite application 200, the table auto-completion algorithm is operable to collect all the information (local or global) in a table model which becomes more and more precise with each piece of incoming information. The table model is also bipartite, with a local model for the client side and a global model for the server side. The table model is constructed per document type. Since subsystem 150 is configured for performing data extraction on multiple document types, there can be multiple table models corresponding to the multiple document types.

In some embodiments, client module 252 runs a local model 262 of the table model on a user device 210. When the local model first encounters a document having a particular document type, it may have a basic or default hypothesis about the document. As discussed above, a document type can be characterized by a set of features. To model the set of features, the local model includes a cell model, a line model, and a document model. The cell model may define various properties of cells of a given column (e.g., size, content, alignment, and so on, each with typical average and variance). The line model may define a number of cells per line and transition (vector) between the cells of a given line. The document model may define typical line distances and a number of lines per document. Skilled artisans appreciate that the cell, line, and document models may vary from document type to document type, as well as from implementation to implementation, depending on the needs of individual use cases. The default or initial values of features described by the cell, line, and document models represent the local model's basic or default hypothesis about a document type.

This hypothesis can be continuously adapted through learning, on-the-fly, from minimal user feedback (e.g., a line or two extracted from a table and corrected by a user) while the local model is utilized by the client module to perform table extraction on the document. For example, the basic hypothesis may be four lines and four column for each item. A user correction may cause the hypothesis to change the number of lines to seven. The client module (which runs on a machine such as the user device) is given knowledge of what to look for (e.g., a reference number, a part number, an amount, etc., through a previously defined scenario). Leveraging the knowledge learned from the user feedback, the client module is operable to update the local model, extract data from the table utilizing the local model, and automatically fill all database fields of a database with data extracted from the table.

Previously, while manual correction is possible, the knowledge that could be gained from that correction on the client side would be lost on data extraction servers running on the server side. In this case, however, that knowledge is retained first in the local model and later in the global model. As the local model is updated, the hypothesis evolves. When table extraction on the document is completed, the client module may communicate the local model updated thus far on the client side to the server module which can then use the knowledge contained in the updated local model to update or otherwise improve the global model on the server side.

As illustrated in FIG. 2, local model 262 and global model 264 can be similarly defined, each having a cell model, a line model, and a document model. While not shown in FIG. 2, in some embodiments, global models on the server side could have a hierarchical structure, with a global root model for each enterprise application (e.g., knowledge of typical columns required by that enterprise application) and specific sub-models (e.g., a cell model, a line model, a document model, etc.) for each of a plurality of layouts supported by the corresponding enterprise application. That is, a layout (also referred to as a layout template) in the global model may be structured into a hierarchy like a tree.

These global models are trained (using previously processed documents) and utilized by server module 254 for extracting data of interest (e.g., table item information) from a huge number of documents, often in the hundreds, thousands, or more. Outputs (extracted data) from server module 254 can be stored in a data store 245 (which can be an embodiment of data store 145 described above) or interpreted (e.g., by subsystem 160 described above) and then stored in data store 245.

As skilled artisans can appreciate, enterprise documents such as invoices, delivery notes, remittances, etc. typically contain large and/or complex tables. Such a document can contain many different items of interest (features for extraction). However, even though a document may contain what looks like a table to human eyes, it is not a table structure that can be read by machines. From a logical perspective, this document (or an image thereof) can be treated like a table extraction so that a machine can view the document as a table and perform an item extraction using the table auto-completion algorithm with continuous and self-adaptive machine learning.

Skilled artisans appreciate that there are many types of machine learning. In this disclosure, a machine can learn, on-the-fly, from positive and negative examples. This is referred to as active learning or adaptive learning, which is part of semi-supervised machine learning in which a learning algorithm is able to interactive with a user to obtain desired outputs at new data points. In this case, the table auto-completion algorithm is able to interactively obtain a user's correction to an automatically extracted data point and store the incorrect data point in the local model as a negative example.

The training of the machine (which runs the client module including the local model) to recognize a new table layout (of a detected document type or a new document type having a new table layout) can begin, from scratch, with some positive examples provided by a user. FIG. 3 is a flow chart illustrating an example of a method 300 for training a local model with positive examples. In some embodiments, method 300 may comprise displaying a database table and an image on a user device through a user interface of a bipartite application (e.g., bipartite application 200) (301). An example of the user interface is shown in FIG. 5A.

Figure 5A:
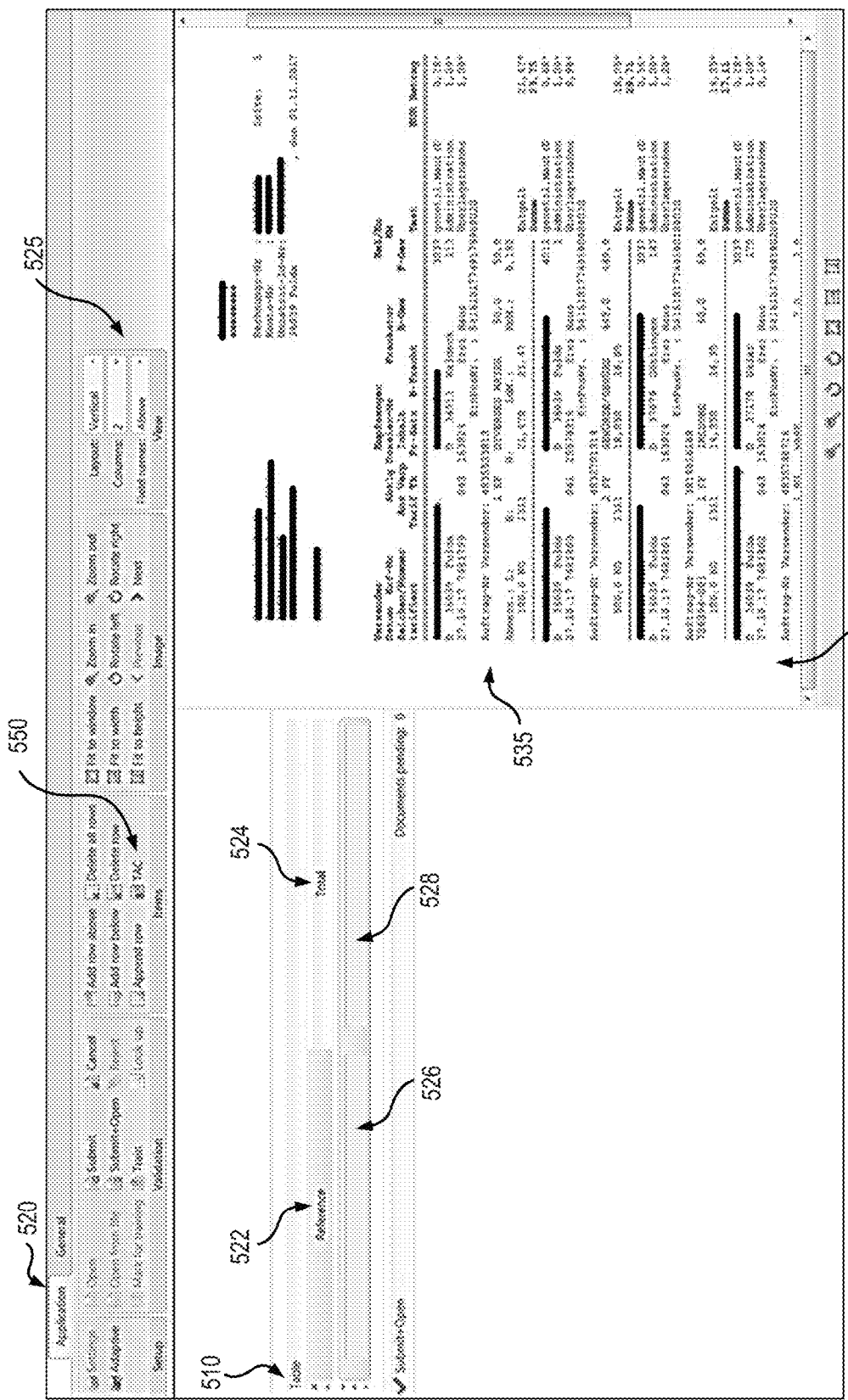

FIG. 5A depicts a diagrammatic representation of a user interface 500 of an application 520 (which can represent a client module of a bipartite application described above) implementing a table auto-completion algorithm (which can be activated or invoked through a user interface element 550, referred to herein as TAC 550), showing an example of a database table 510 and an example of a document image 530. Database table 510 may have a plurality of columns (e.g., columns 522, 524) having a plurality of database fields (e.g., database fields 526, 528). The number of columns can be customized using a layout configuration function 525 of user interface 500. The number of database fields can depend on the number of lines in document image 530. Document image 530 can be a scanned image of a document containing a table 535. As discussed above, this table does not have a table structure that can be read by machines. Rather, table 535 may contain coded text generated by an optical character recognition (OCR) function in a manner known to those skilled in the art.

Figure 5B:
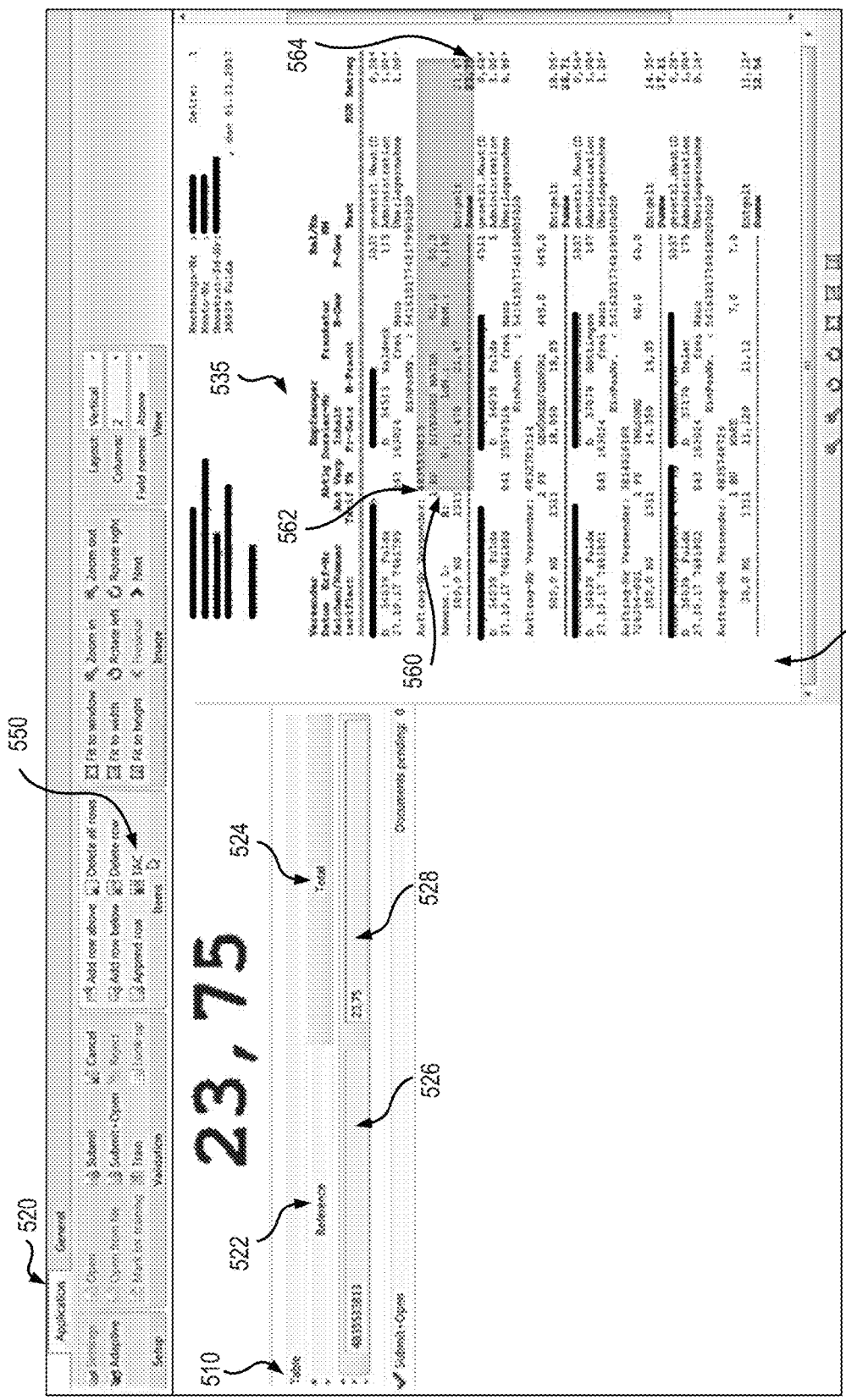

As illustrated in FIG. 5B, a user can highlight a portion 560 of table 535 on the user interface to define the initial coordinates. The user may select TAC 550, which activates the table auto-completion algorithm. Responsively, the client module running the local model of the table auto-completion algorithm is operable to analyze portion 560 of table 535 highlighted by the user on user interface 500 (305) and determine, based on the initial coordinates defined by the user, that data points 562, 564 should be extracted (310). The client module is further operable to extract data points 562, 564 from table 535 and enter data points 562, 564 into database fields 526, 528 (315), as shown in FIG. 5B.

Since the initial coordinates are user-defined, data points determined using these initial coordinates can provide positive information from which a machine (referring to the machine that runs the client module including the local model) can learn. From the perspective of a machine implementing the table auto-completion algorithm, a table structure contains data that are structured in two dimensions (e.g., columns and rows), with each column sharing objects or items of the same or similar type (e.g., date, amount, supplier, etc.). Thus, in this case, the machine can learn what columns are (e.g., columns 522, 524), what they contain (e.g., data points 562, 564 in database fields 526, 528), what type of values (e.g., numbers, alphanumeric values, sizes, etc.), the relationships among the extracted data points, and so on. The pieces of information thus learned can be stored in the local model as positive examples (320).

After the initial extraction (based on the initial coordinates defined by the user), the user can run TAC 550 again. Each time TAC 550 is run, it applies the local model. At this time, the local model has been updated with the positive examples (e.g., from a single portion which, in one embodiment, can have only a single line). However, the local model has not yet seen a negative example.

Figure 5C:
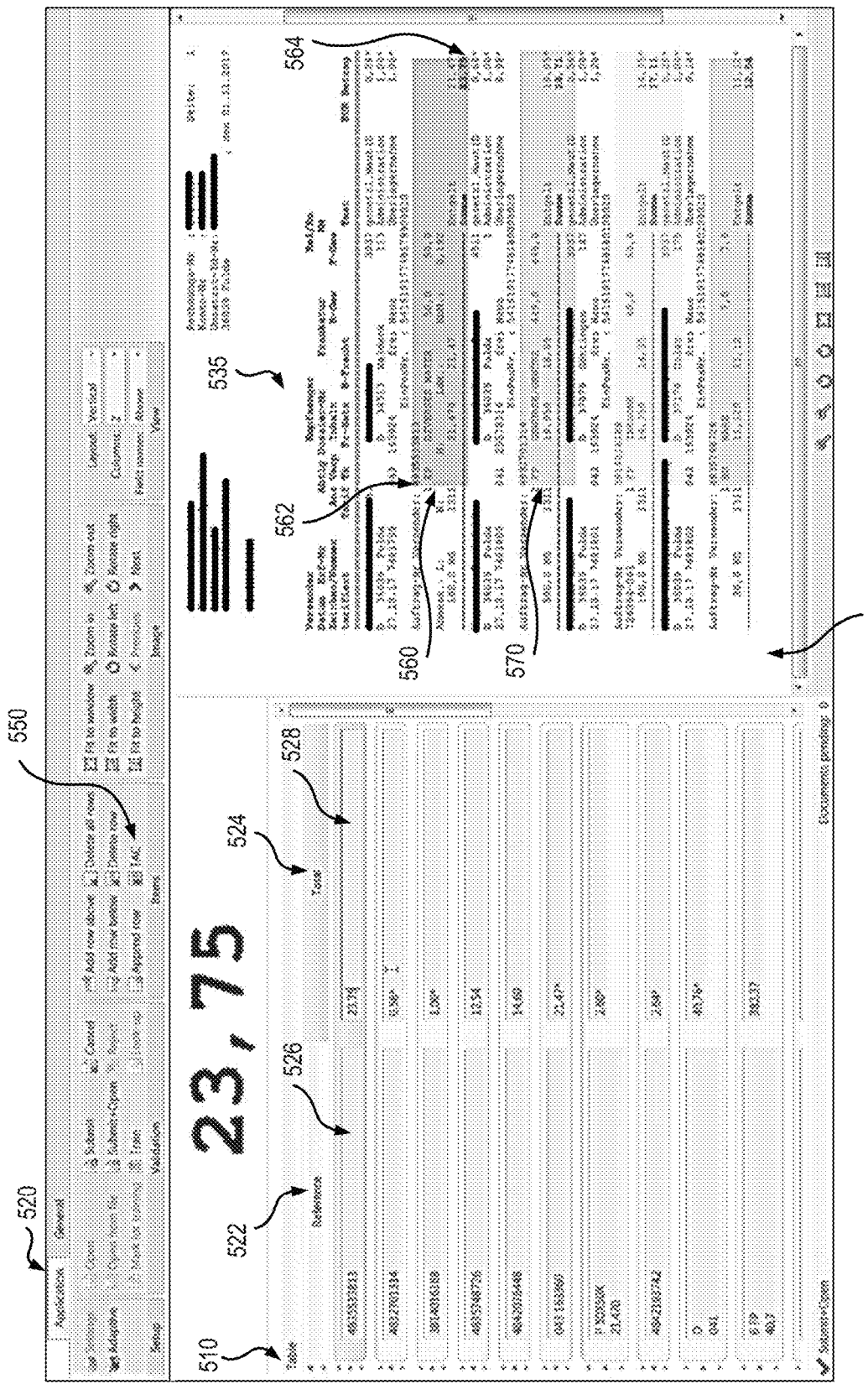

FIG. 4 is a flow chart illustrating an example of a method 400 for training a local model with a negative example when TAC 550 is run. In some embodiments, referring to FIGS. 4 and 5B, method 400 may comprise determining what data points are to be extracted from table 535 (401). This determination may be performed by the table auto-completion algorithm utilizing the local model which has been updated with the positive examples (including the cell model, the line model, and the document model that hypothesize, based on a given scenario, what the data points are and what their positions and relationships are in the table). The determined data points are automatically extracted from table 535 and entered into corresponding database fields (405), as shown in FIG. 5C. With the initial capture (e.g., from a single line or a few lines in a single portion), automatic capture of the entire table 535 may not yet be completely correct.

Figure 5D:
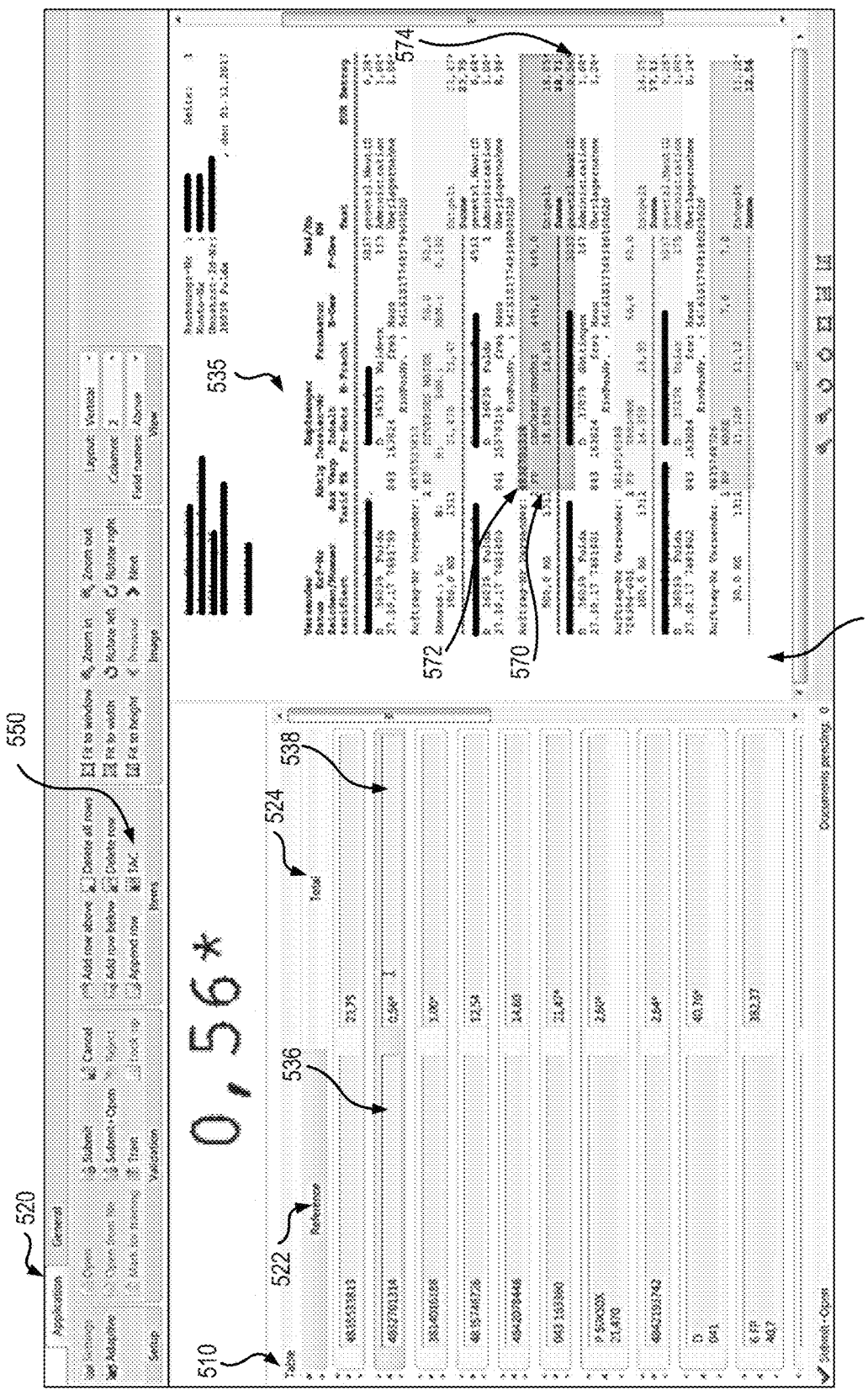

Through user interface 500 (which can include a validation screen, as shown in FIG. 5C), the user can view both database table 510 and table 535 and verify data points automatically extracted by the table auto-completion algorithm. In this case, portion 560 of table 535, which is highlighted by the user, has five lines and, using portion 560 as an example, the local model hypothesized that the next portion (e.g., portion 570 of table 535) from where next data points can be extracted (e.g., for columns 522, 524) also has five lines. However, as illustrated in FIG. 5D, the user can see that this hypothesis is incorrect and that portion 570 should have four lines instead. This error means that, while data point 572 was correctly automatically extracted and automatically entered into database field 536 of column 522, data point 574 was incorrectly extracted and entered into database field 538 of column 524.

Figure 5E:
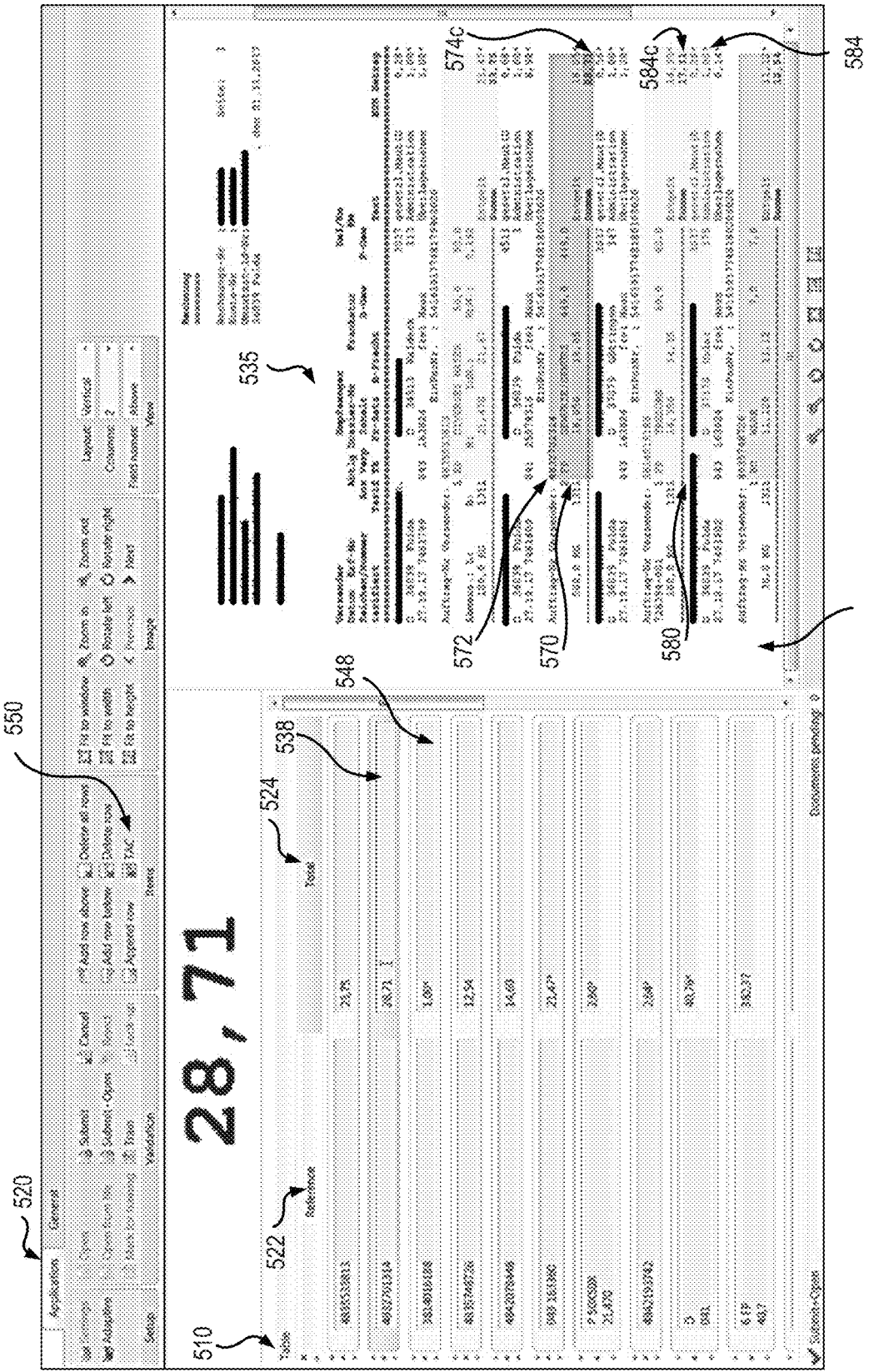

As shown in FIG. 5E, the user can select database field 538 of column 524 and provide the correct value (data point 574c) in database field 538. In some cases, this single correction may be enough for the table auto-completion algorithm to correct itself (through the local model) and complete data extraction from table 535. The number of corrections may depend on the complexity of the table.

Referring to FIG. 4, method 400 may further including receiving the correction (410) and correct the local model with the user-provided correction. As described above, the machine implementing the table auto-completion algorithm can learn from each interaction with the user (e.g., a correction in a second line or second portion) and improve itself. For example, if the user deletes a suggested line, the machine implementing the table auto-completion algorithm can learn on the fly that this type of data is undesired and delete all the subsequent lines of the same type of data. This minimizes the number of table lines in need of manual capture (i.e., the logical minimum needed to grasp the user's intensions). The local model, therefore, can be a very useful tool to aid manual capture.

In this case, the machine learns a negative example and stores this knowledge in the local model. As illustrated in FIG. 4, method 400 may loop back so the machine can, using the knowledge thus learned, automatically recalculate data points that should be extracted (401) and automatically updates, on the fly, the database fields where necessary (405). That is, outcome from the automatic table data extraction can already be improved after only one manual correction. Further, in some cases, manual capture can be reduced to a single manual correction.

Figure 5F:
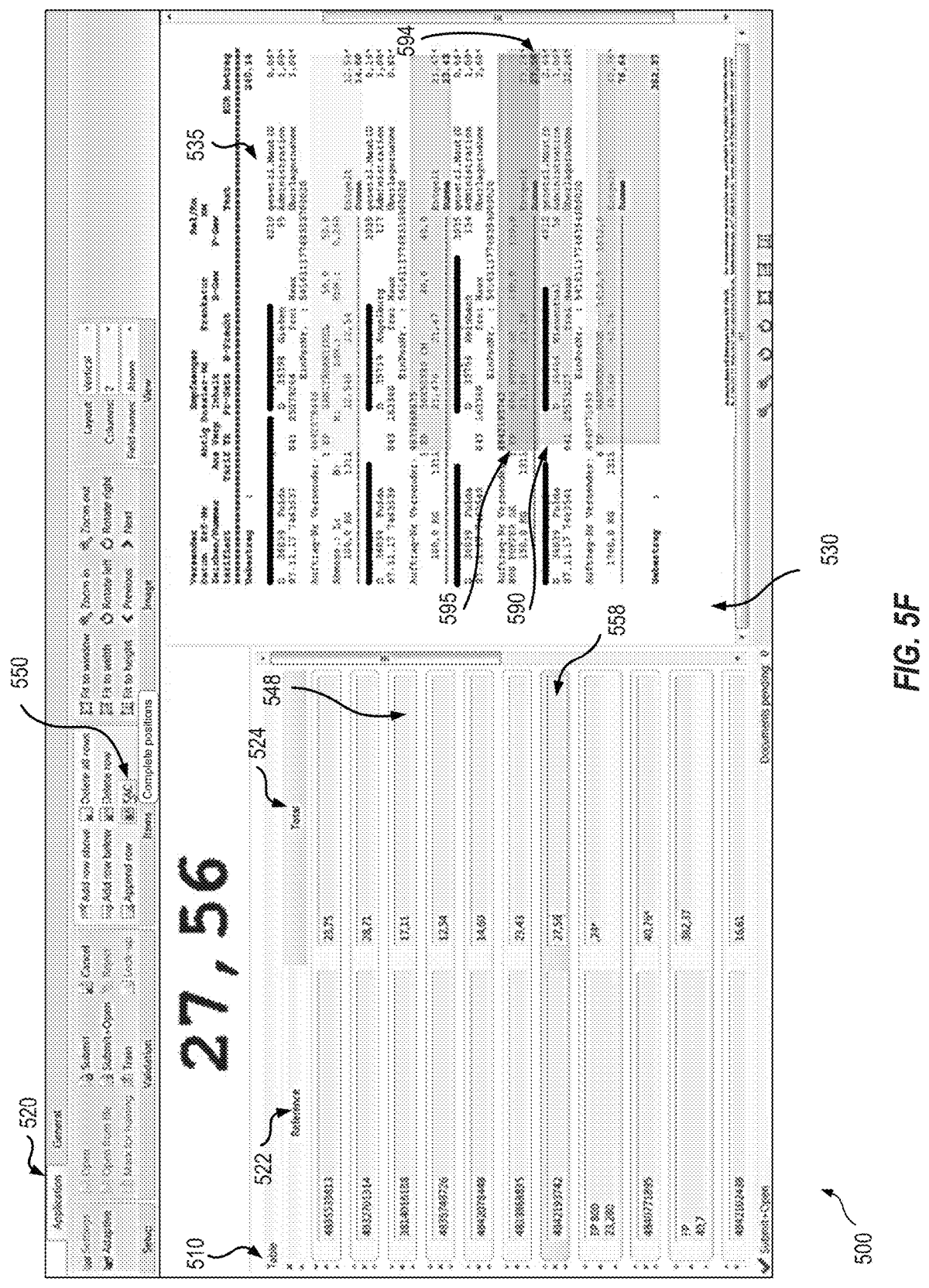

In the example of FIG. 5E, table 535 is quite complex (for instance, with varying numbers of lines and inconsistent line distances). The user can see that data point 584 in portion 580 of table 535 was also incorrectly extracted and entered into database field 548 of column 524. As before, the user can select database field 548 of column 524 and provide the correct value (data point 584c) in database field 548, as shown in FIG. 5F.

As illustrated in FIG. 4, each time a correction is made, the machine implementing the table auto-completion algorithm (which includes method 400) can learn from that correction, automatically correct its local model, recalculate data points in table 535, extract them from table 535, and correspondingly update database table 510 with the recalculated data points thus extracted from table 535. The user can scroll down and verify whether the updated database table 510 still contains any error.

This process can repeat until there are no more corrections and the end of table 535 is reached (420). FIG. 5F shows the last error close to the end of table 535 being corrected in database field 558 of column 524 for data points 595, 594 of portion 590 of table 535.

The local model and global model discussed above (e.g., local model 262 and global model 264) represent two different types of input for this continuous and self-adaptive machine learning. As described above, the machine can learn from interaction with users (through local models, referred to as local learning), as well as from previously processed documents (through global models, referred to as global learning). Each global model can be trained and tested on a server machine using documents (of a certain type and layout) that have been processed on the server side. Knowledge gained from either the client slide or the server can be used to improve both the local models as well as the global models.

For example, referring to FIG. 4, when the table extraction is completed, the client module may send the updated local model to the server module (which, in one embodiment, runs on subsystem 150). The server module may update the global model (for the same document type) utilizing the local model. The global model thus updated can then be utilized by the table auto-completion algorithm in a backend document processing process to automatically determine data points from multiple documents, automatically extract the data points thus determined, and populate a database with the data point thus extracted. In this way, the server module executing on the server machine can leverage the learned knowledge from the local model in performing table extraction with respect to a particular document type and layout to improve the global model accordingly and utilize the improved global model to perform automatic extraction of table information from a mass amount (e.g., hundreds, thousands, and tens of thousands, etc.) of documents of the same document type and layout and automatically enter the table information thus extracted from the documents into database fields. The knowledge gained on the client side through the local model can contribute to speeding up the automation of data extraction by the server model on the server side.

Likewise, in some embodiments, a local model can leverage the settings of a global model to construct an initial hypothesis and refine the hypothesis through user interaction. Once trained, a local model (and a global model) can automatically and accurately extract table item information without human intervention, an example of which is shown in FIGS. 6A-6B.

Figure 6A:
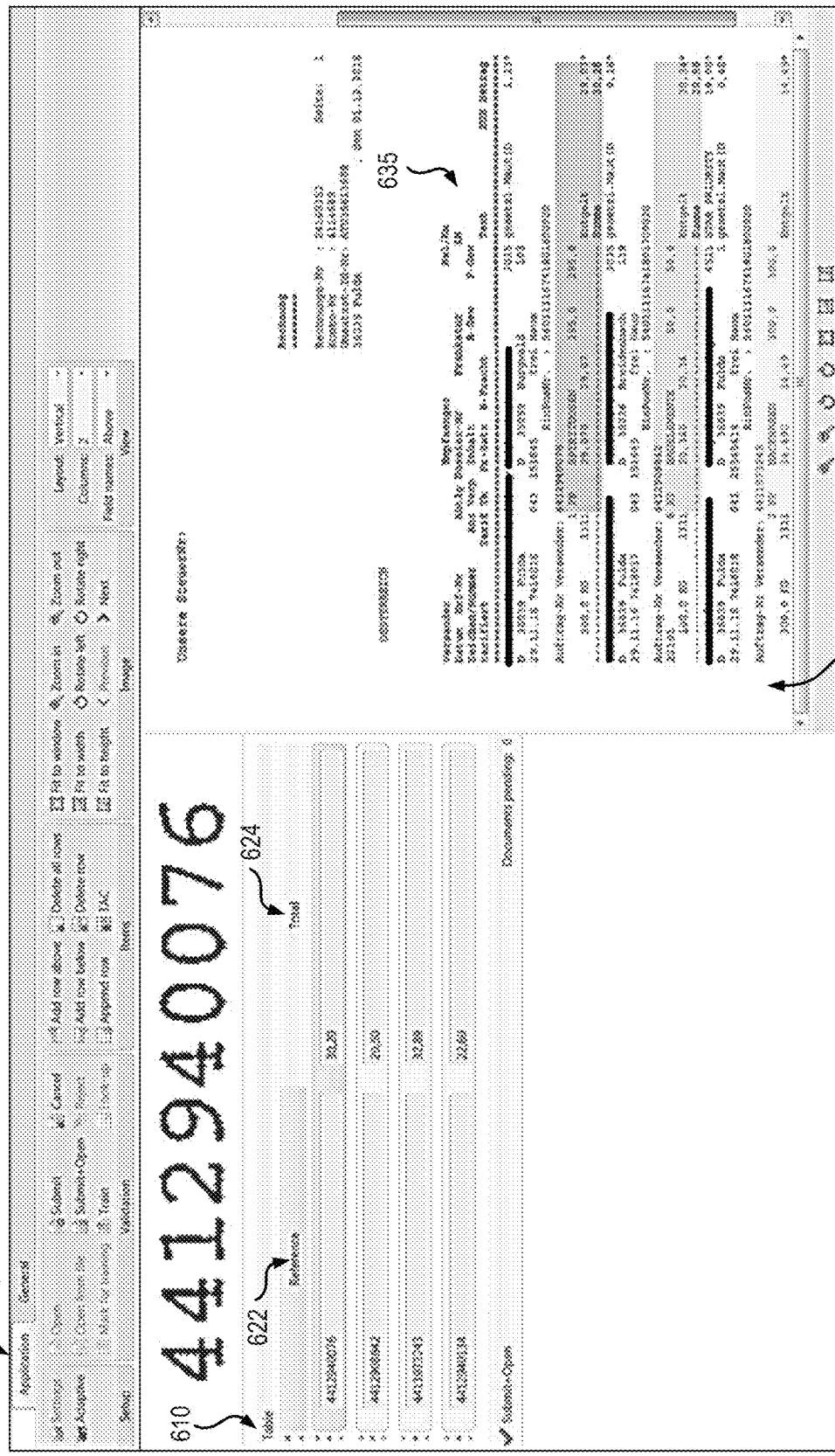
FIGS. 6A-6B depict diagrammatic representations of a user interface of a bipartite application implementing a table auto-completion algorithm, illustrating an example of automatic extraction of table item information by the table auto-completion algorithm utilizing a trained local model according to some embodiments.
Figure 6B:
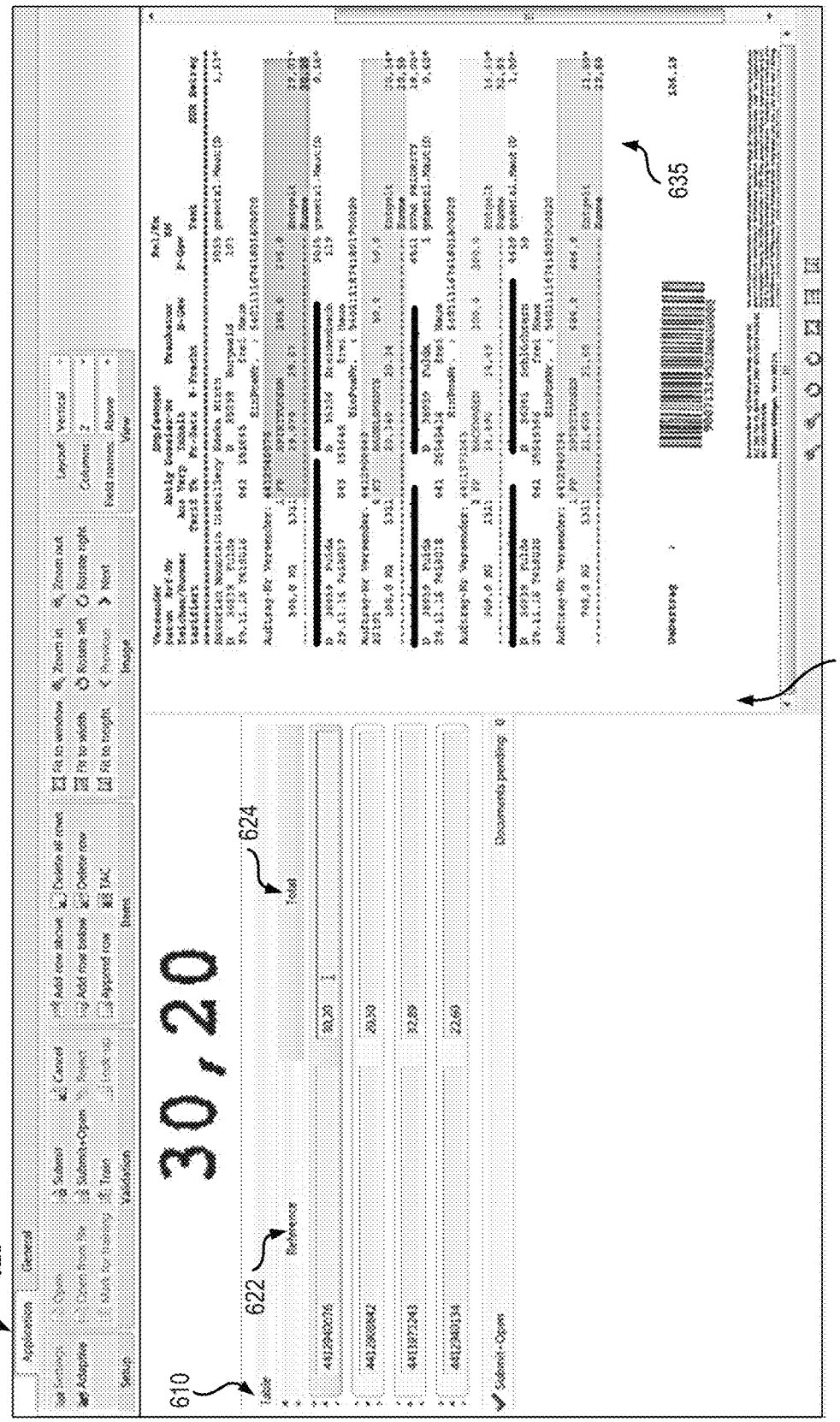

FIG. 6A depicts a diagrammatic representation of a user interface 600 of an application 620. Similar to application 520 discussed above, application 620 may implement a client module of a table auto-completion algorithm. In the example of FIG. 6A, data points have already been automatically extracted from table 635 of document image 630 and entered into database fields of columns 622, 624 of database table 610. As shown in FIG. 6B, a user can view table 635 and verify results of the automatic table extraction. In this example, after the local model is trained once on a document of the same type, the table auto-completion algorithm is able to completely, automatically, and correctly extract all the data points from another document of the same type and no correction is necessary.

Figure 7A:
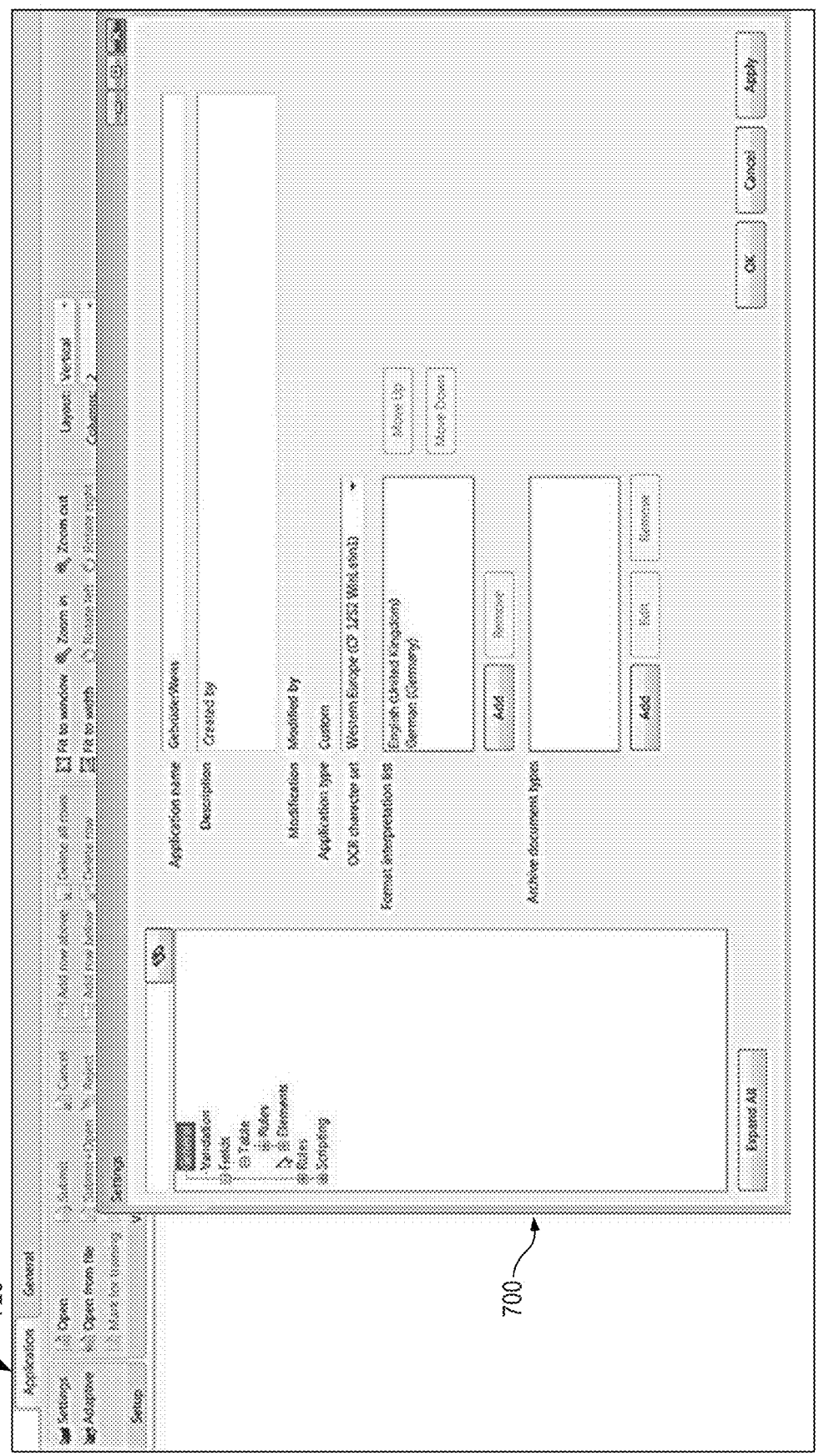
FIGS. 7A-7B depict diagrammatic representations of a user interface of a bipartite application, illustrating an example of setting up capture parameters used by the bipartite application according to some embodiments.
Figure 7B:
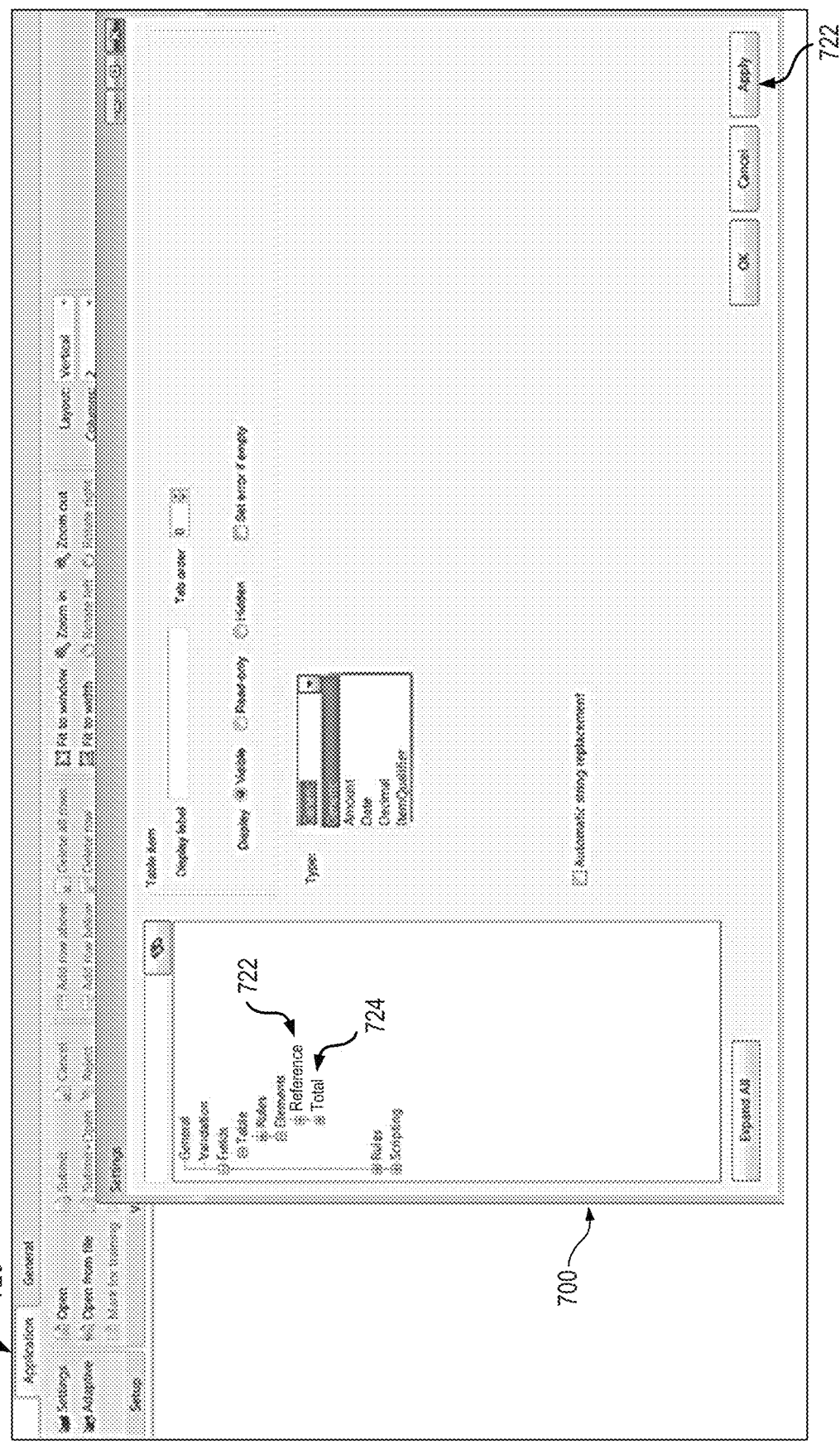

Skilled artisans appreciate that the interfaces shown in FIGS. 5A-6B are exemplary for the purpose of illustration and not of limitation and that a user interface of a bipartite application disclosed herein can be configured in many ways, for instance, through settings shown in FIGS. 7A-7B. In the example of FIGS. 7A-7B, application 720 (which can be similar to applications 520, 620 described above) includes a settings function 700. In some embodiments, a user can use settings function 700 to configure capture parameters that will be used in the table extraction. For example, the user can configure how many columns of data are to be captured from a document, what each column is to be called, what type of data each column is to capture, etc. In this example, the user only wants to capture two columns (elements 722, 724) and named them "Reference" and "Table." These names can be given by the user to the table auto-completion algorithm as a scenario (which, in one embodiment, represents a custom project). In practice, most documents come with defined scenarios known to the algorithm beforehand (however, the number of layouts is almost infinite, which contributes to the difficulty of automated table extraction). Users can use the user interface to customize document types and scenarios. Once the user-configured settings are applied (through button 722 shown in FIG. 7B), application 720 is operable to render a database table with the user-configured settings and display it to the user (e.g., as columns 522, 524 shown in FIGS. 5A-5F or columns 622, 624 shown in FIGS. 6A-6B).

Embodiments disclosed here can be particularly useful for large, complex tables (e.g., have high complexity, high variants, different from previously seen tables). There are three aspects of complexity that must be considered: the characters of the variants within a table from one line to another line; the variants from one document to the next document of the same template (e.g., if the invoices from the same business partner, same vendor, from document to document, different items, different number of items, different number of pages) for one document template; and the variants from one document template to another template and the number of document templates. For instance, if an invoice application has invoices from 10,000 vendors across all industries across all countries, there's another type of variants between the layouts (layout templates) as compared to a company that only has 600 vendors in one industry.

Variants in these dimensions are relevant in calculating how many training would be needed, how complex is the task that the system (e.g., subsystem 150) should solve ultimately. In a straightforward case, a few layout templates with low variants from document to document, it can take only a few minutes to train on a few documents and the system can perform automatic capture on documents based on the training. On the other end of the spectrum can be a huge number of documents with very high variants from document to document.

Complex tables with high variants are difficult for automated table extraction because even the best, currently existing extraction algorithms lack the ability to learn from the ever changing world and thus still require manual corrections. Further, complex tables tend to be voluminous and long (e.g., 10 pages, 50 pages, 100 pages) which makes it very hard to capture manually. Thus, even in manual corrections, automatic support is highly desirable.

To greatly enhance the speed and quality of manual data capture of complex tables and increase the rate of completely extracting complex tables automatically, embodiments disclosed herein combine best of two worlds. The global model has rich, but potentially imprecise or conflicting information from past experience. The local model has limited, but more specific and precise information from manual correction of a document. By combining local and global models, the imprecise or conflicting information in the global model can be improved with the more specific and precise information from the local model. Likewise, the local model can benefit from the rich information in the global model and create a better initial hypothesis so that the length of training may be shortened the next time it encounters a new document type (or a new layout or type of table with new kinds of columns that have not been seen by the table auto-completion algorithm before) and starts from scratch. The process of learning and training is integrated, on the fly, no specific training process is needed: a machine implementing the table auto-completion algorithm learns while doing the work. The specific knowledge (table recognition) can be applied to a document more than once, since the table can appear several times in one document. In this way, humans would not have to do a lot of manual reviews and corrections and table extraction can be performed efficiently, adaptively, and fast. If a document has a lot of pages and thousands of items, the improvements in table extraction automation provided by embodiments disclosed herein can be significant.

FIG. 8 illustrates an exemplary architecture for enterprise computing environment 800 that includes network 814 that can be bi-directionally coupled to user computer 812, enterprise computer 815, and server computer 816. Server computer 816 can be bi-directionally coupled to database 818. Network 814 may represent a combination of internal and external networks that enterprise computing environment 800 may utilize for various types of network communications known to those skilled in the art.

For the purpose of illustration, a single system is shown for each of user computer 812, enterprise computer 815, and server computer 816. However, within each of user computer 812, enterprise computer 815, and server computer 816, a plurality of computers (not shown) may be interconnected to each other over network 814. For example, a plurality of user computers 812 and a plurality of enterprise computers 815 may be coupled to network 814. User computers 812 may run a client module of a bipartite application disclosed herein. Server computer 816 may run a capture center disclosed herein, including a server module of the bipartite application. Enterprise computers 815 may run a computing facility that utilizes outputs provided by the capture center.

User computer 812 can include central processing unit ("CPU") 820, read-only memory ("ROM") 822, random access memory ("RAM") 824, hard drive ("HD") or storage memory 826, and input/output device(s) ("I/O") 828. I/O 828 can include a keyboard, monitor, printer, electronic pointing device (e.g., mouse, trackball, stylus, etc.), or the like. User computer 812 can include a desktop computer, a laptop computer, a personal digital assistant, a cellular phone, or nearly any device capable of communicating over a network. Enterprise computer 815 may be similar to user computer 812 and can comprise CPU 850, ROM 852, RAM 854, HD 856, and I/O 858.

Likewise, server computer 816 may include CPU 860, ROM 862, RAM 864, HD 866, and I/O 868. Server computer 816 may include one or more backend systems employed by an enterprise to process information in enterprise computing environment 800. Processed information can be stored in a database management system such as database 818. Many other alternative configurations are possible and known to skilled artisans.

Each of the computers in FIG. 8 may have more than one CPU, ROM, RAM, HD, I/O, or other hardware components. For the sake of brevity, each computer is illustrated as having one of each of the hardware components, even if more than one is used. Each of computers 812, 815, and 816 is an example of a data processing system. ROM 822, 852, and 862; RAM 824, 854, and 864; HD 826, 856, and 866; and database 818 can include media that can be read by CPU 820, 850, or 860. Therefore, these types of memories include non-transitory computer-readable storage media. These memories may be internal or external to computers 812, 815, or 816.

Portions of the methods described herein may be implemented in suitable software code that may reside within ROM 822, 852, or 862; RAM 824, 854, or 864; or HD 826, 856, or 866. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a non-transitory computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. In general, the functions of the invention can be achieved in many ways. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine-readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the disclosure should be determined by the following claims and their legal equivalents.

What is claimed is:

1. A method, comprising:
    displaying, by a user device, a user interface having a database table and an image, the database table having a plurality of columns, the image containing a table, the user interface including a user interface element for activating a table auto-completion algorithm on the user device;
    responsive to activation of the table auto-completion algorithm through the user interface element on the user device, performing, by the user device:
        determining coordinates from a portion of the table highlighted on the image displayed through the user interface;
        determining data points using the coordinates;
        automatically extracting the data points from the portion of the table;

storing information about the data points in a machine learning model as positive examples for on-the-fly training of the machine learning model to recognize a table layout;
determining, based on the portion of the table, a next portion of the table;
determining additional data points in the next portion of the table;
automatically extracting the additional data points from the next portion of the table;
receiving or obtaining, through the user interface, a correction to the additional data points automatically extracted from the next portion of the table;
storing information about the correction in the machine learning model as a negative example for the on-the-fly training of the machine learning model; and
automatically continuously extracting table information from the table utilizing the table layout thus recognized, the positive examples, and the negative example until extraction of the table information from the table is completed and the table information extracted from the table is entered into the database table.

2. The method according to claim 1, further comprising:
responsive to the correction, automatically updating any data field in the database table affected by the correction.

3. The method according to claim 1, further comprising:
automatically correcting the machine learning model based on the correction received or obtained through the user interface.

4. The method according to claim 1, further comprising:
sending the machine learning model to a server module operating on a server machine.

5. The method according to claim 1, further comprising:
receiving, through the user interface, user-configured settings for the database table; and
rendering the database table with the user user-configured settings.

6. The method according to claim 1, wherein the machine learning model models a set of features of a document type.

7. The method according to claim 6, wherein the machine learning model includes a cell model, a line model, and a document model for modeling the set of features of the document type.

8. A system, comprising:
a processor;
a non-transitory computer-readable medium; and
stored instructions translatable by the processor for:
displaying a user interface having a database table and an image, the database table having a plurality of columns, the image containing a table, the user interface including a user interface element for activating a table auto-completion algorithm;
responsive to activation of the table auto-completion algorithm through the user interface element, performing:
determining coordinates from a portion of the table highlighted on the image displayed through the user interface;
determining data points using the coordinates;
automatically extracting the data points from the portion of the table;
storing information about the data points in a machine learning model as positive examples for on-the-fly training of the machine learning model to recognize a table layout;
determining, based on the portion of the table, a next portion of the table;
determining additional data points in the next portion of the table;
automatically extracting the additional data points from the next portion of the table;
receiving or obtaining, through the user interface, a correction to the additional data points automatically extracted from the next portion of the table;
storing information about the correction in the machine learning model as a negative example for the on-the-fly training of the machine learning model; and
automatically continuously extracting table information from the table utilizing the table layout thus recognized, the positive examples, and the negative example until extraction of the table information from the table is completed and the table information extracted from the table is entered into the database table.

9. The system of claim 8, wherein the stored instructions are further translatable by the processor for:
responsive to the correction, automatically updating any data field in the database table affected by the correction.

10. The system of claim 8, wherein the stored instructions are further translatable by the processor for:
automatically correcting the machine learning model based on the correction received or obtained through the user interface.

11. The system of claim 8, wherein the stored instructions are further translatable by the processor for:
sending the machine learning model to a server module operating on a server machine.

12. The system of claim 8, wherein the stored instructions are further translatable by the processor for:
receiving, through the user interface, user-configured settings for the database table; and
rendering the database table with the user user-configured settings.

13. The system of claim 8, wherein the machine learning model models a set of features of a document type.

14. The system of claim 8, wherein the machine learning model includes a cell model, a line model, and a document model for modeling the set of features of the document type.

15. A computer program product comprising a non-transitory computer-readable medium storing instructions translatable by a processor for:
displaying a user interface having a database table and an image, the database table having a plurality of columns, the image containing a table, the user interface including a user interface element for activating a table auto-completion algorithm;
responsive to activation of the table auto-completion algorithm through the user interface element, performing:
determining coordinates from a portion of the table highlighted on the image displayed through the user interface;
determining data points using the coordinates;
automatically extracting the data points from the portion of the table;
storing information about the data points in a machine learning model as positive examples for on-the-fly training of the machine learning model to recognize a table layout;

determining, based on the portion of the table, a next portion of the table;

determining additional data points in the next portion of the table;

automatically extracting the additional data points from the next portion of the table;

receiving or obtaining, through the user interface, a correction to the additional data points automatically extracted from the next portion of the table;

storing information about the correction in the machine learning model as a negative example for the on-the-fly training of the machine learning model; and automatically continuously extracting table information from the table utilizing the table layout thus recognized, the positive examples, and the negative example until extraction of the table information from the table is completed and the table information extracted from the table is entered into the database table.

16. The computer program product of claim 15, wherein the instructions are further translatable by the processor for: responsive to the correction, automatically updating any data field in the database table affected by the correction.

17. The computer program product of claim 15, wherein the instructions are further translatable by the processor for: automatically correcting the machine learning model based on the correction received or obtained through the user interface.

18. The computer program product of claim 15, wherein the instructions are further translatable by the processor for: sending the machine learning model to a server module operating on a server machine.

19. The computer program product of claim 15, wherein the instructions are further translatable by the processor for: receiving, through the user interface, user-configured settings for the database table; and rendering the database table with the user user-configured settings.

20. The computer program product of claim 15, wherein the machine learning model models a set of features of a document type.

* * * * *

UNITED STATES PATENT AND TRADEMARK OFFICE
CERTIFICATE OF CORRECTION

PATENT NO. : 11,455,462 B2
APPLICATION NO. : 17/134964
DATED : September 27, 2022
INVENTOR(S) : Matthias Theodor Middendorf, Gisela Barbara Cacilie Hammann and Carsten Peust It is certified that error appears in the above-identified patent and that said Letters Patent is hereby corrected as shown below:

On the Title Page (73), replace "Open Text Software SA ULC, Halifax (CA)" with --Open Text SA ULC, Halifax (CA)--.

Signed and Sealed this
Seventh Day of February, 2023

Katherine Kelly Vidal
*Director of the United States Patent and Trademark Office*